March 15, 1966     J. H. SHACKELFORD     3,239,935
ARTIFICIAL DENTURE AND APPARATUS FOR DETERMINING BITE PRESSURE
Filed Feb. 9, 1962     2 Sheets-Sheet 1
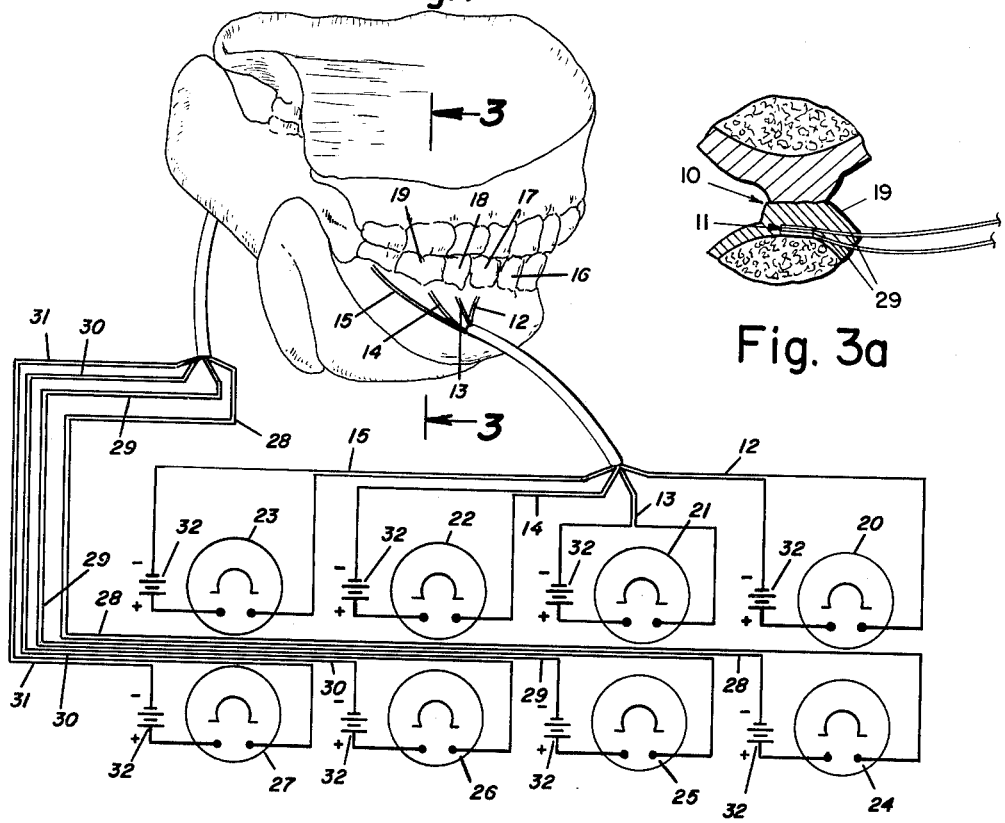
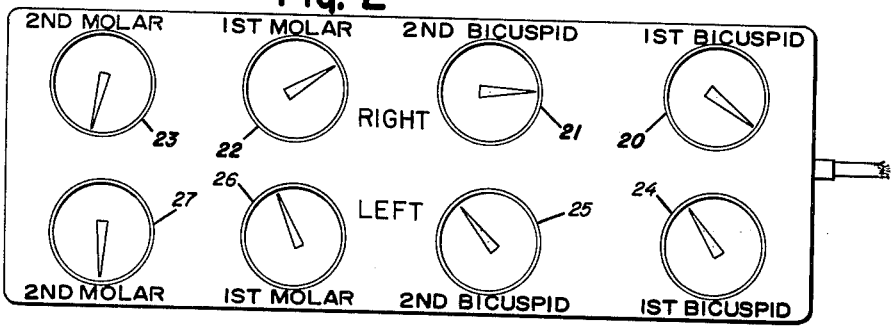
INVENTOR
John H. Shackelford
by
Attorney March 15, 1966   J. H. SHACKELFORD   3,239,935
ARTIFICIAL DENTURE AND APPARATUS FOR DETERMINING BITE PRESSURE
Filed Feb. 9, 1962   2 Sheets-Sheet 2
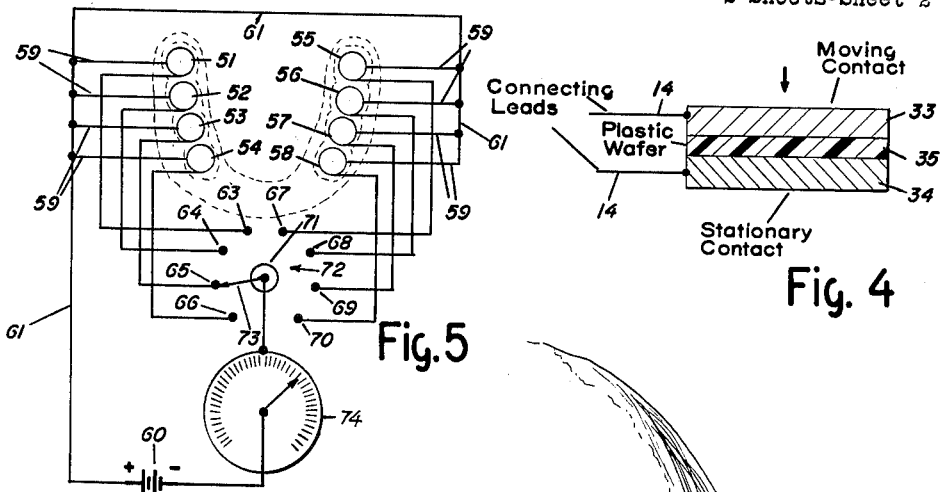
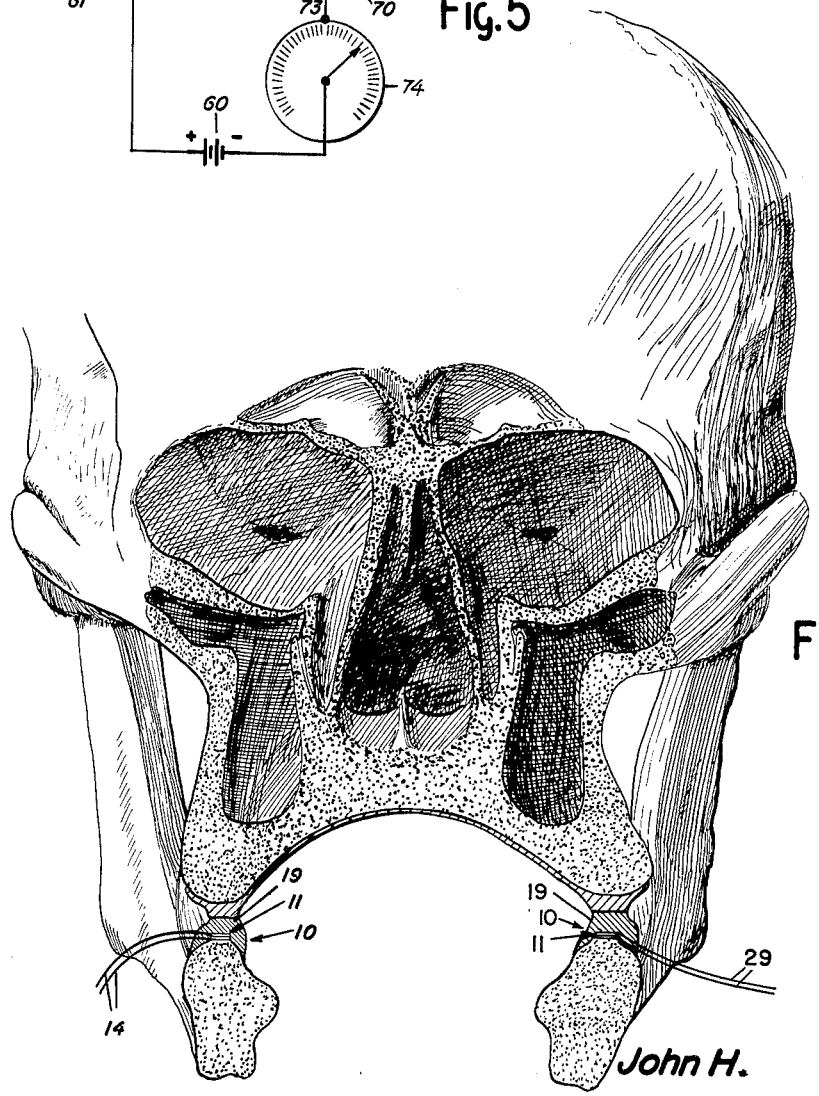
INVENTOR
John H. Shackelford
by Felix A. Russell
Attorney

United States Patent Office 3,239,935
Patented Mar. 15, 1966

3,239,935
ARTIFICIAL DENTURE AND APPARATUS FOR DETERMINING BITE PRESSURE
John H. Shackelford, 706 Latrobe Bldg., 2 E. Read St., Baltimore 2, Md.
Filed Feb. 9, 1962, Ser. No. 172,219
8 Claims. (Cl. 32—19)

This invention relates to bite pressure adjustable dentures and method and apparatus for adjusting the same.

Generally there is provided an artificial denture, or a pair of such dentures, in which a series of pressure sensitive resistance elements is incorporated in the denture base adjacent the gum contact areas thereof. Each resistance element has a pair of electric conductors leading therefrom for connection into an electric circuit including a source of low potential electric power and an ohmmeter or milliammeter. Separate meters can be used for each resistance unit for simultaneous comparative readings, or a selector switch can be used with a single meter to reduce the cost and size of the equipment.

The comparative readings are studied by the dentist who can adjust the occlusal surfaces of certain teeth to produce the desired distribution of bite pressures along the artificial denture or dentures.

The adjustment of bite pressures in artificial dentures heretofore has been largely guesswork, which when not successful resulted in sore gums and/or unsatisfactory mastication. The present invention removes trial and error procedure from the adjusting of denture bite pressures.

It is accordingly an object of this invention to provide a method for accurately adjusting and distributing the bite pressures along one or a pair of artificial dentures, as desired.

It is another object of the invention to provide an artificial denture having a series of pressure sensitive electric elements embedded therein so that pressure readings can be taken during fitting and adjusting or at desired subsequent times.

It is a further object of the invention to provide a simple and inexpensive apparatus for obtaining readings either simultaneously or sequentially from the several electrical elements of a denture of the type disclosed for comparison and balancing of the bite pressures.

Other and further objects of the invention will become apparent from a reading of the following specification taken in conjunction with the drawings, in which:

FIGURE 1 is a partly perspective and partly schematic view of a preferred embodiment of the invention, FIGURE 2 is a plan view of the meter assemblage of the apparatus, FIGURE 3 is a front elevational view, partly enlarged, in section taken on line 3—3 of FIGURE 1, FIGURE 3a is an enlarged view of a portion of the dentures as shown in section on the right of FIGURE 3.

FIGURE 4 is an enlarged elevational view, in transverse medial cross section, of one of the pressure sensitive resistance elements, and FIGURE 5 is a wiring diagram of a single meter embodiment of the invention.

With reference now to FIGURES 1 to 4 of the drawings, the numeral 10 generally designates a lower artificial denture having embedded therein on each side of the denture four pressure sensitive wafers 11 (hereinafter more fully described) one located below or close to each molar and each bicuspid, and desirably close to or forming a part of the gum-engaging surface of the denture. While the invention is herein illustrated as being embodied in a lower denture, it should be noted that it could be equally well applied to an upper denture, if preferred, although the lower denture location is more convenient where a choice can be made (that is, when both the upper and lower opposed teeth are artificial).

Each of four pairs of conductors 12, 13, 14 and 15 leads from a resistance wafer 11 under each of the first and second bicuspids 16 and 17 and the first and second molars 18 and 19, respectively, to a first or right side row of ohmmeters or milliammeters 20, 21, 22 and 23. A second row of meters 24, 25, 26 and 27 is connected by pairs of leads 28, 29, 30 and 31, respectively, to the corresponding teeth on the left side of the denture 10, not visible in FIG. 1.

While for simplification of the wiring diagram, each meter 20–27 has been shown as having a separate battery source of power 32, it is obvious that a common cell or battery (or step-down transformer) could be employed to energize all the meter and resistor circuits in known parallel hookup, as is used in the modified circuit of FIG. 5 hereinafter described.

Each pressure sensitive resistance element 11 (FIG. 4) comprises a pair of terminal or contact discs 33 and 34 to which one of its pairs of flexible leads 12–15 and 28–31 is connected, one lead of each pair to each disc. The discs 33 and 34 are made of any electrically conductive material suitable for dental purposes, such as stainless steel or alloys of noble metals.

Between the discs 33 and 34 there is positioned and adhered thereto a wafer 35 of temperature sensitive resistance material, such as the resin produced when rare earths, for example cerium, are processd with zirconium tetrachloride, as described in a Columbia University publication entitled "Simple Transducers to Detect or Record Operant Amplitude," written by Ralph F. Hefferline et al. under research grant M–2961 (C) S1, National Institute of Health. Similar pressure sensitive cells are described by Dudley B. Clark in "Product Engineering" published Sept. 16, 1957 by McGraw-Hill Publishing Co., Inc., New York 36, N.Y. The resistance materials described by these publications could be substituted for that specified above, or other forms of transducers (piezoelectric crystals, granular material, etc.) could be employed with the necessary circuit and other changes. It is desired to incorporate by reference the subject matter of these publications as parts of this specification.

When the denture 10 is in place and the patient bites down on the same, simultaneous readings can be made from all eight (more or fewer, if preferred) meters by the dentist. From a comparison of the simultaneous readings (over a range of progressively stronger muscular effort as desired) the dentist can relatively accurately estimate the amount of grinding needed to produce the optimal bite pressure pattern. After each adjusting step a new set of readings is quickly and easily made to ascertain the progress of the adjustment and to arrive quickly at the final optimal adjustment.

In the species of FIG. 5, a denture has a series of pressure sensitive cells 51–58 embedded therein adjacent the base of the molars and bicuspids shown. The cells are coupled by one lead 59 of each cell to a source of power (battery 60) by a common conductor 61.

Second leads extend from each of the cells 51–58 to a series of switch contacts 63–70, respectively, corresponding in pattern positions to the positions of the teeth in the denture. Thus as the operator knob 71 of a multiple-position switch 72 is rotated to position its contact arm 73 in engagement progressively with the contacts 63–70, different readings will be obtained on the dial of a milliammeter 74, corresponding to the tooth positions matched by the switch arm's relative positions. Thus a single meter can be utilized to obtain all readings in sequence or in any desired repetitive order.

While but two forms of the invention have been shown and described herein, it will be readily apparent to those skilled in the art that many minor modifications may be made without departing from the spirit of the invention or the scope of the appended claims. For example, it is obvious that there could be substituted for the conventional galvanometer-type ohmmeters or milliammeters described above, a calibrated oscilloscope or other known electrical instrument for measuring pressure induced changes in the resistances of the pressure sensitive wafers. The pressure induced by natural teeth against natural teeth can be measured by the above-described equipment by placing the sensitive wafers in a flexible membrane which is placed between the natural teeth.

What is claimed is:

1. An apparatus for determining bite pressure comprising; an artificial denture having a base, said base having a gum engaging portion, a plurality of spaced pressure sensitive resistance elements embedded in the said gum engaging portion of said base in position to be subjected to bite pressures, meter means adapted to indicate bite-pressure induced changes in the resistance of said elements, a pair of conductors extending out from each of said resistance elements, and connecting means by which said conductors are connected to said meter means.

2. An artificial denture which is adapted to be connected to remote means for indicating bite-induced pressures, said denture comprising: a denture base having a gum engaging pressure surface, and a series of pressure sensitive electrical devices embedded in said denture base in spaced areas along said surface so as to be subjected to bite pressures at respective areas of said surfaces, said devices including a pair of terminal plates and a layer of pressure sensitive resistance material interposed between said plates for compression thereby.

3. Structure according to claim 2, said layer of pressure sensitive material being a wafer of plastic material.

4. Structure according to claim 3, said plastic material being a resin produced by processing a rare earth element with zirconium tetrachloride.

5. Structure according to claim 4, said rare earth element being cerium.

6. Apparatus according to claim 1, said connecting means being a multiple position switch and said meter means being a single meter selectively connectable by said switch to each of said elements.

7. Apparatus according to claim 6, said switch having a position indicator with a pattern corresponding to the pattern arrangement of said elements.

8. Apparatus according to claim 1, said meter means being a separate meter for each of said elements, whereby simultaneous comparative readings can be obtained from all of said elements.

References Cited by the Examiner

UNITED STATES PATENTS

| | | | |
|---|---|---|---|
| 705,187 | 7/1902 | Zeleny | 73—341 |
| 1,539,143 | 5/1925 | Petry | 33—3 |
| 2,205,875 | 6/1940 | Hencz | 340—213 |
| 2,543,512 | 2/1951 | Shapiro | 340—213 |
| 2,674,797 | 4/1954 | Skinner | 32—19 |
| 2,773,308 | 12/1956 | Van Court | 32—19 |
| 2,896,324 | 7/1959 | Plotnick | 32—2 |
| 2,909,836 | 10/1959 | Salava | 32—2 |
| 2,937,443 | 7/1960 | Skinner | 32—19 |
| 3,057,205 | 10/1962 | Howard et al. | 73—388 |
| 3,064,354 | 11/1962 | Pos | 32—19 |

OTHER REFERENCES

Dental Cosmos, 1927, pp. 570–571.

Clark, Product Engineering, Sept. 16, 1957, pp. 106–109.

DELBERT B. LOWE, *Primary Examiner.*

ROBERT E. MORGAN, *Examiner.*